Patented Jan. 5, 1932

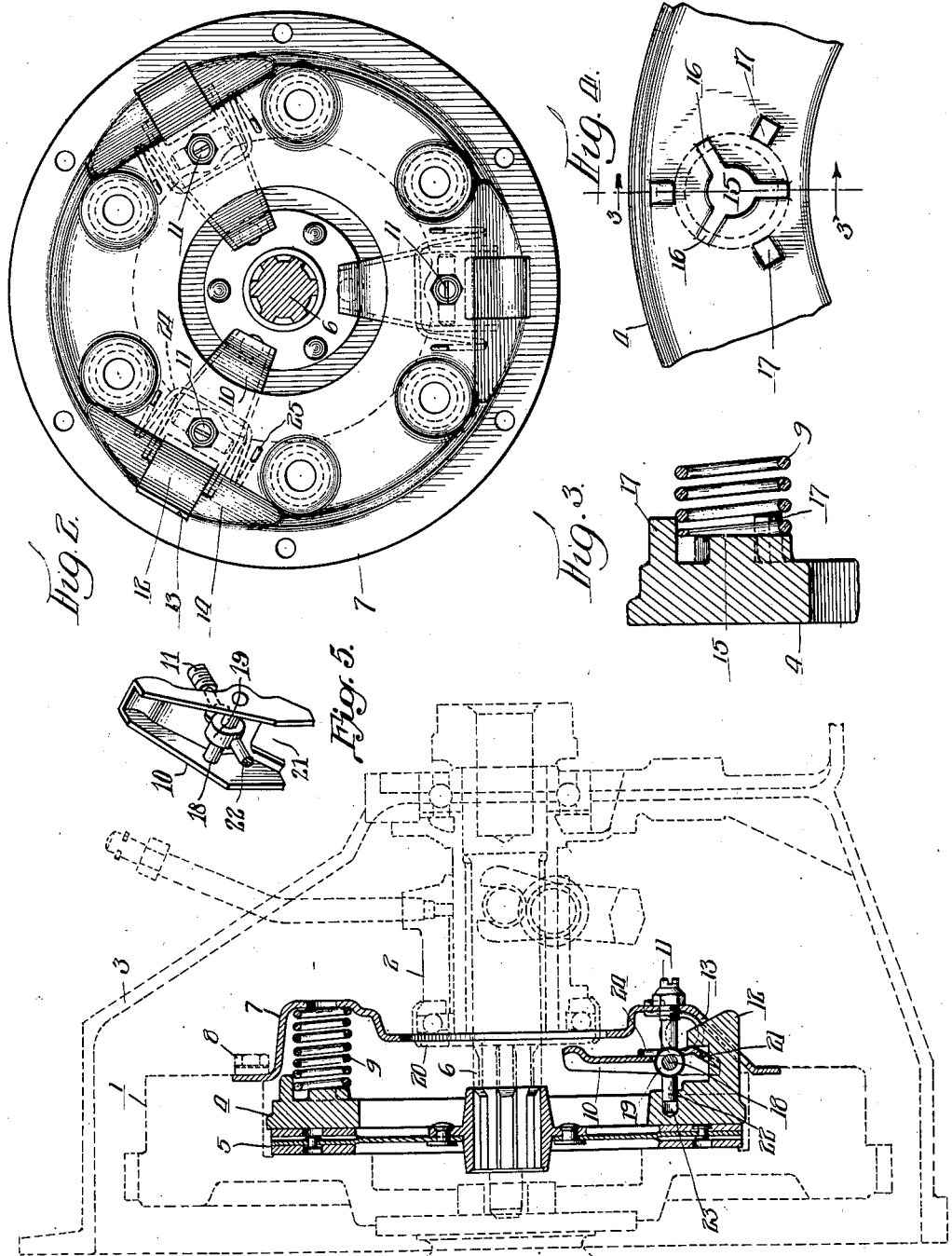

1,839,590

UNITED STATES PATENT OFFICE

HAROLD V. REED, OF CHICAGO, ILLINOIS, ASSIGNOR TO THE BORG & BECK COMPANY, OF CHICAGO, ILLINOIS, A CORPORATION OF ILLINOIS

FRICTION CLUTCH

Application filed October 2, 1929. Serial No. 396,639.

This invention relates to friction clutches of the type which are adapted primarily but not exclusively for use in automotive vehicles.

One of the objects of the invention is to protect the springs from heat from the pressure ring by providing a limited contact of the springs with the ring and for a circulation of air between the springs and the ring to materially reduce the flow of heat from the ring to the springs.

A further object of the invention is to provide each of the clutch levers with a floating anchorage to the pressure ring so that they will function freely in the desired manner but will be held against bodily movement independent of the ring.

In the accompanying drawings I have illustrated a selected embodiment of the invention and referring thereto, Fig. 1 is a sectional elevation showing the invention in full lines and associated parts in broken lines.

Fig. 2 is a plan elevation of the clutch looking at the outside of the cover.

Fig. 3 is a detail enlarged sectional view on the line 3—3 of Fig. 4, and Fig. 4 is a similar plan view of the spring mounted on the pressure ring.

Fig. 5 is a detail view of a finger and the mounting therefor employed in the device.

Referring to the drawings, 1 is a flywheel rigidly mounted on a driving shaft (not shown), 2 is a clutch release device operating on the driven shaft and 3 is a housing enclosing the clutch and its associated parts. A pressure ring 4 is arranged for bodily movement to clamp a clutch plate 5 on the driven shaft 6 between itself and the flywheel whereby to impart motion from the driving shaft and flywheel through the pressure ring to the driven shaft. It will not be necessary to describe a clutch plate of particular construction because my invention may be used with clutch plates of many different kinds. A cover 7 is fastened to the flywheel by bolts 8. Springs 9 are interposed between the pressure ring and the cover for normally clamping the clutch plate in operative engagement with the flywheel, and clutch levers 10 are pivotally mounted on eyebolts 11 supported in the cover and adapted to be operated by the clutch release device 2 to retract the pressure ring against the tension of springs 9 and release the clutch. The pressure ring has a boss 12 made in the form of an inwardly directed hook for each lever 10 and the cover has an opening 13 to receive each boss and is flattened at 14 adjacent each opening. Since the cover 7 is bolted to the flywheel and the bosses 12 engage the openings 13 with a fairly snug fit the pressure ring is driven from the flywheel and revolves therewith. The pressure ring is provided with a stud 15, Figs. 3, 4, for each spring 9 and this stud is of less diameter than the spring and is provided with radially disposed ribs 16 to support the spring. Lugs 17 are provided on the ring 4 about the stud 15 to retain the spring on the ribs of the stud. These lugs are spaced apart and are located between the ribs so that the end of the spring will be held by the studs in place on the ribs. Since the ribs project beyond the body of the ring and the studs are spaced apart between the ribs the spring will have limited contact with the ring and there is sufficient space between the end of the spring and the body of the ring to provide for circulation of air. By this limited contact of the spring with the ring and the provision for circulation of air at the contacting end of the spring the flow of heat from the ring to the spring is materially reduced and to such an extent that the efficiency of the spring is not reduced by heat flowing from the ring.

Each lever is provided with a pivot pin 18 which passes throug an eye 19 in its bolt 11 and forms a fulcrum for the lever, Fig. 1. The inner end of the lever engages the bearing 20 of the clutch release device. The outer end of the lever is recessed at 21 to receive the boss 12. This engagement of the lever with the boss and the mounting of the eyebolt on the cover will prevent the lever from swinging laterally and maintain the lever in proper radial position to the pressure ring. To prevent lateral movement of the lever I provide the bolt with an extension 22 which engages an opening 23 in the pressure ring. This extension is free to move longitudinally of the bolt in the opening to accommodate any desired adjustment and any longitudinal movement of the bolt but it fits fairly snugly against lateral movement in the opening to prevent lateral movement of the lever. The floating anchorage of the bolt to the pressure ring will insure against any tendency for lateral bodily movement of the lever and bolt. A spring 24 engages the lever between its inner end and the fulcrum and has its ends 25 engaged with the cover to hold the inner end of the lever away from the bearing 20 when the clutch is engaged and to hold the lever in constant engagement with the boss to prevent chatter.

I have shown the invention in the clutch disclosed in the application of David E. Gamble, Serial No. 389,962, filed September 3, 1929, as illustrating a practical embodiment of the invention but I do not limit the invention to this embodiment but reserve the right to use it in any other clutch and to make such changes in the form, construction and arrangement of parts as may be necessary or desirable for different adaptations, within the scope of the following claims:

I claim:

1. In a friction clutch comprising a pressure ring and a pressure spring, a stud on the ring, and ribs on the ring radially disposed to the stud and forming a bearing for the end of the spring to support the spring away from the body of the ring.

2. In a friction clutch comprising a pressure ring and a pressure spring, spaced ribs on the ring forming a bearing for the end of the spring to support the spring away from the body of the ring, and means for retaining the end of the spring on the ribs.

3. In a friction clutch comprising a pressure ring and a pressure spring, spaced ribs on the ring forming a bearing for the end of the spring to support the spring away from the body of the ring, and lugs on the ring arranged about the end of the spring to retain the spring on the ribs.

4. In a friction clutch comprising a cover adapted to be secured to a flywheel, a pressure ring, a lever, a pivot member mounting the lever on the cover, and means on the pivot member slidably engaging the ring and providing a floating anchorage between the lever and ring to prevent lateral movement of the lever.

5. A friction clutch comprising a cover adapted to be secured to a flywheel, a lever, means pivotally mounting the lever on the cover, a pressure ring having an opening, and means connected with said pivotal means and engaging said opening to prevent lateral movement of the lever.

6. A friction clutch comprising a cover adapted to be secured to a flywheel, an eyebolt fastened to said cover, a lever pivotally mounted on said eyebolt, a pressure ring having an opening, and an extension on said eyebolt engaging said opening to prevent lateral movement of the lever.

HAROLD V. REED.